United States Patent
El-Fishawy et al.

(10) Patent No.: US 7,133,687 B1
(45) Date of Patent: Nov. 7, 2006

(54) DELIVERY OF VOICE DATA FROM MULTIMEDIA MESSAGING SERVICE MESSAGES

(75) Inventors: Sani El-Fishawy, Woodside, CA (US); Konstantin Othmer, Mountain View, CA (US)

(73) Assignee: Core Mobility, Inc., Mountain View, CA (US)

( * ) Notice: Subject to any disclaimer, the term of this patent is extended or adjusted under 35 U.S.C. 154(b) by 230 days.

(21) Appl. No.: 10/661,033

(22) Filed: Sep. 12, 2003

Related U.S. Application Data

(63) Continuation-in-part of application No. 10/407,955, filed on Apr. 3, 2003.

(51) Int. Cl.
*H04Q 7/20* (2006.01)
*H04M 11/10* (2006.01)

(52) U.S. Cl. ............... 455/466; 455/412.1; 455/412.2; 455/413

(58) Field of Classification Search ............... 379/67.1, 379/88.11, 88.12, 88.13, 88.18, 88.25, 88.26; 455/412.1, 412.2, 466, 413
See application file for complete search history.

(56) References Cited

U.S. PATENT DOCUMENTS

| | | | |
|---|---|---|---|
| 4,856,066 A | | 8/1989 | Lemelson |
| 5,146,487 A * | | 9/1992 | Bergsman et al. ........ 379/88.24 |
| 5,646,982 A * | | 7/1997 | Hogan et al. ............ 379/88.22 |
| 5,751,791 A * | | 5/1998 | Chen et al. .............. 379/88.13 |
| 5,781,614 A | | 7/1998 | Brunson |
| 5,905,774 A | | 5/1999 | Tatchell et al. |
| 5,951,638 A | | 9/1999 | Hoss et al. |
| 5,974,449 A | | 10/1999 | Chang et al. |
| 6,038,296 A | | 3/2000 | Brunson et al. |
| 6,052,440 A * | | 4/2000 | Yuhn ...................... 379/88.13 |
| 6,075,844 A | | 6/2000 | Goldberg et al. |
| 6,097,941 A | | 8/2000 | Helferich |
| 6,144,644 A * | | 11/2000 | Bajzath et al. ............. 370/259 |
| 6,198,808 B1 | | 3/2001 | Martin |
| 6,233,318 B1 | | 5/2001 | Picard et al. |
| 6,282,270 B1 | | 8/2001 | Porter |
| 6,418,307 B1 * | | 7/2002 | Amin ........................ 455/413 |
| 6,438,217 B1 | | 8/2002 | Huna |
| 6,463,131 B1 * | | 10/2002 | French-St. George et al. ..................... 379/88.23 |
| 6,636,733 B1 * | | 10/2003 | Helferich ................. 455/412.2 |
| 6,785,363 B1 * | | 8/2004 | Culliss ..................... 379/67.1 |
| 6,799,033 B1 * | | 9/2004 | Kanefsky ................. 455/412.1 |
| 6,826,264 B1 * | | 11/2004 | Valco et al. ............... 379/67.1 |
| 6,882,708 B1 * | | 4/2005 | Bedingfield et al. ..... 379/88.18 |

* cited by examiner

*Primary Examiner*—Bing Q. Bui
(74) *Attorney, Agent, or Firm*—Workman Nydegger

(57) ABSTRACT

A sender can create and send an instant voice message that can be delivered to recipients with SMS-enabled wireless stations regardless of the other communication capabilities of the wireless stations and the network or network service providers of the recipients. The sender creates an instant voice message and sends the message to a message server, which stores the message in an interactive voice response (IVR) system. If the instant voice message is a Multimedia Messaging Service (MMS) message and the intended recipient's device does not support the MMS protocol, the voice content is extracted from the message and stored in the IVR system. An SMS notification is sent to the recipient and includes instructions for accessing the instant voice message from the IVR system. The SMS notification enables the recipient to access the instant voice message. The recipient can also create and reply to the voice message.

34 Claims, 6 Drawing Sheets

DELIVERY OF VOICE DATA FROM MULTIMEDIA MESSAGING SERVICE MESSAGES

CROSS-REFERENCE TO RELATED APPLICATION

This application is a continuation-in-part of U.S. patent application Ser. No. 10/407,955, filed Apr. 3, 2003, which is incorporated herein by reference.

BACKGROUND OF THE INVENTION

1. The Field of the Invention

The present invention relates to the delivery of voice messages in wireless networks. More specifically, the present invention is directed to extracting the voice portion of a Multimedia Messaging Service (MMS) message and sending the voice portion to one or more recipient wireless stations utilizing the Short Message Service (SMS) protocol to permit delivery of the message regardless of the communication capabilities of the recipient wireless stations.

2. The Relevant Technology

The popularity of all types of wireless stations, such as mobile telephones and hybrid devices such as "smart phones" that combine the functionality of mobile telephones with that of personal digital assistants (hereinafter referred to as wireless stations) is undeniable. People want or need to communicate using voice while they are mobile. At the same time, the use of text messaging is also rising such that virtually any wireless station on a 2G or 3G network can receive a Short Message Service message. While text messaging using protocols such as SMS are somewhat popular, voice is still the preferred way to communicate when using a wireless station, since using the keypad of such devices to input and send text messages can be cumbersome and time consuming. Voice messages are more convenient because they can be easily created and they take advantage of the native ability of wireless stations to receive and output audio data.

Conventional voicemail systems provide the capability for anyone to leave a voicemail message after a telephone call has failed to reach the intended recipient. Using a conventional voicemail system to deliver a voice message to the recipient, a sender typically first must dial the recipient's telephone number in an attempt to reach the recipient "live" and then fail to do so, whereupon the voicemail system intercedes to allow a voice message to be recorded. In many cases, callers hoping to be able to leave a non-intrusive voice message instead interrupt the intended recipient. While conventional voicemail systems represent a convenient adjunct to direct telephone communication between a caller and a recipient, they often do not allow voice messages to be created and sent by senders without first making an attempt to establish a live telephone conversation with the recipient.

Another technology, Multimedia Messaging Service (MMS), allows senders with MMS-enabled wireless stations to send multi-media messages, including voice messages, to other MMS-enabled wireless stations. However, the proliferation of MMS-compatible wireless stations has been and continues to be very slow. It is likely that MMS-compatible wireless stations will not be widely accepted by consumers until MMS users can reliably send MMS messages to a large number of potential recipients. The problem, of course, is that the large number of potential MMS recipients will not exist until MMS-compatible wireless stations have already been widely accepted by consumers. Another option for sending MMS-based voice messages involves sending the messages to a website where they can be retrieved by the recipients. While this alternative may be occasionally acceptable, the use of a web browser to retrieve a voice message is inconvenient for the recipient when he does not have access to a web browser and is cumbersome compared to the use of telephones to access voice messages.

The foregoing technologies have introduced the convenience of voice messaging to large numbers of users. However, none of these techniques allow senders to create and initiate transmission of a voice message to any selected recipient without first having attempted to place a live telephone call. Furthermore, the foregoing techniques do not allow the sender to send a voice message to a recipient, regardless of the communication capabilities of the receiving device that is used by the recipient, nor do they allow a recipient of such a message to send a voice reply back to the sender in the original audio format, regardless of the capabilities of the receiving device.

SUMMARY OF THE INVENTION

According to the invention, the sender creates a voice message without first having to attempt a live telephone call (hereinafter referred to as an "instant voice message"). The sender records an instant voice message onto his wireless station by pressing one button and choosing the target recipient, either by manually inputting a telephone number or by choosing the intended recipient from a contact list resident on the wireless station. Upon completion of recording the instant voice message, the sender indicates to the wireless station that the message should be sent. If the sender has a network connection, he indicates to the wireless station to send the message. If the sender does not have a network connection, the instant voice message is stored on the wireless station until such time as a network connection is resumed. The instant voice message can be delivered according to the invention to substantially any wireless stations in use today without requiring the recipient wireless stations to have any specific voice messaging capabilities and regardless of the networks or network service providers associated with the recipient wireless stations.

One embodiment of the present invention is directed to systems and methods for enabling users of MMS-enabled wireless stations to transmit an MMS-based instant voice message without requiring the recipients to have MMS-enabled wireless stations. According to this aspect of the invention, a user of an MMS-enabled wireless station may create an instant voice message, optionally include other media such as a photograph, and cause at least the voice portion of the MMS message to be delivered to one or more selected recipients. Once the MMS message has been created, it is transmitted to a multimedia messaging service central (MMS-C), wherein it is determined whether or not the target recipient has an MMS-enabled wireless station.

If the recipient has an MMS-enabled wireless station, the entire MMS message, including the voice portion and photograph or other media, can be delivered to the recipient in the conventional manner. If the recipient does not have an MMS-enabled wireless station, but does have an SMS-enabled wireless station, the MMS message is forwarded to a message server where the voice portion of the MMS message is extracted. The voice portion of the MMS message is then forwarded to an interactive voice response (IVR) system where it is stored and made accessible to the recipient. The message server communicates with one or more Short Message Service Centers (SMSC), or SMS gateways, causing the SMSC to initiate sending an SMS message containing an embedded phone number for accessing the IVR system to the recipient's wireless station.

Once the recipient has been alerted by the SMS message to the arrival of the instant voice message, the recipient can access the message at his convenience using his wireless station. Depending on the particular capabilities of the wireless station, the recipient will press one or more keys on the wireless station keypad or soft buttons on a touch screen which will cause the wireless station to automatically dial the IVR system. If the IVR system is able to capture the Mobile Directory Number (MDN) or "calling party identifier" of the recipient's wireless station, the IVR system responds by authenticating the recipient for access to the instant voice message. If the IVR system is unable to capture the MDN or "calling party identifier" of the recipient's wireless station, it prompts the recipient to input the telephone number of his wireless station for authentication. Once authenticated, the recipient follows the instructions of the IVR system automated attendant to manage received instant voice messages. Instant voice message management activities may include, for example, play, replay, reply to, save and delete.

In this manner, at least the voice portion of MMS messages can be delivered according to the invention to substantially any wireless station in use today without requiring the recipient wireless station to have any specific voice messaging capabilities and regardless of the networks or network service providers associated with the recipient wireless stations. Thus, the present invention embraces both new and legacy wireless stations and permits users to easily record and transmit instant voice messages to substantially any recipients.

According to another aspect of the invention, a recipient may initiate delivery of a reply to the received instant voice message in the audio format used by the original sender's wireless station. For example, once the recipient has accessed the instant voice message from the IVR system, the recipient is presented with the option to reply to the message. By following the IVR system prompts, the recipient may record a reply instant voice message and initiate delivery of the reply instant voice message back to the sender in the original MMS format. In this embodiment of the reply mechanism, after the reply instant voice message has been recorded, the IVR system forwards it to the message server, which transcodes it into a standard audio format that can be utilized by MMS, such as the adaptive multi-rate (AMR) format. The reply instant voice message is then sent to the MMS-C, which in turn transmits it to the original sender (now the recipient) as an MMS-based instant voice message. In another embodiment, the reply instant voice message can be delivered in another audio format to a recipient device that is not MMS-enabled. Because the recipient composes the reply instant voice message using the IVR system, the recipient can do so regardless of the type of telephony device that is used and does not need to be a subscriber of or affiliated with the operator of the message server or provides the messaging services to the original sender.

The invention also extends to a sender having the ability to initiate placing a voice call from any telephony device to an IVR system without having been prompted to do so, recording an instant voice message, addressing it to a target recipient, and initiating transmission of the instant voice message to the recipient without being aware of the capabilities of the recipient's receiving device. The instant voice message is stored in an IVR system, and a message server is notified of the availability of the instant voice message. If the message server is aware of the capabilities of the target recipient's receiving device, it will communicate with the appropriate network element, such as an SMSC or MMS-C, to initiate delivery of the instant voice message. If the message server is not aware of the capabilities of the target recipient's receiving device, the message server will attempt to deliver the instant voice message to an MMS-C. If the MMS-C cannot deliver the instant voice message as an MMS message, it generates an error message back to the message server and the message server stores the instant voice message in the IVR system for retrieval by the recipient. The message server then instructs an SMSC or SMS gateway to cause an SMS notification to be sent to the recipient's SMS-enabled device, alerting the recipient that the instant voice message is available and instructing the recipient about how to access the instant voice message form the IVR system.

In this manner, the present invention enables users to create instant voice messages and initiate delivery thereof to recipients that have SMS-enabled wireless stations regardless of the other communication capabilities of the recipient devices. The invention also enables users of MMS enabled wireless stations to send the voice portion of MMS messages to recipients that have SMS-enabled wireless stations regardless of the other communication capabilities of the recipient devices thereby vastly extending the reach of conventional MMS systems for the important voice mode of communication. Thus, instant voice messages can be transmitted to a large segment of the public and do not require senders and recipients to use wireless stations that are MMS-enabled or have other dedicated voice or multimedia messaging capabilities. Moreover, the instant voice messaging systems of the invention represent a new form of telecommunication that does not require senders to first make an unsuccessful attempt to establish a live telephone conversation with the intended recipient.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for delivering an instant voice message to an SMS-enabled recipient wireless station regardless of the other communication capabilities of the recipient wireless station. Instant voice messages are made available according to the invention by storing the instant voice messages in an IVR system and sending SMS notifications to the recipient wireless stations with instructions for accessing the instant voice messages stored in the IVR system. If the instant voice message is an MMS message containing both a voice portion and other media and the intended recipient cannot receive the MMS message in the conventional manner, the voice portion is extracted from the message and stored in the IVR system. In this manner, instant voice messages can be conveniently created using any messaging protocol and sent to recipients with new or legacy wireless stations without requiring the wireless station to support any particular messaging protocol. Moreover, users of MMS-enabled wireless stations can cause voice messages to be delivered to non-MMS users.

Figure 1:
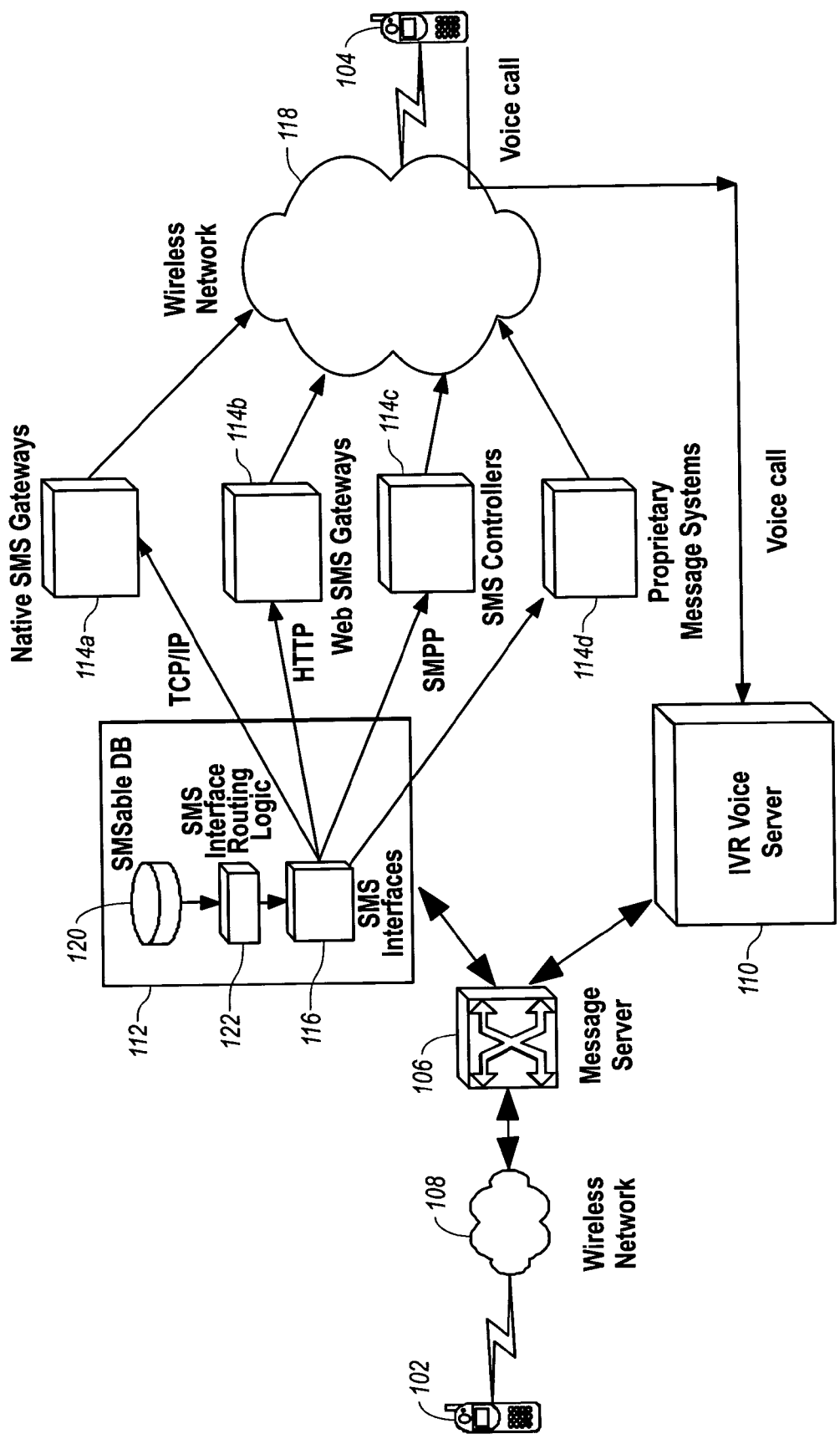
FIG. 1 is a block diagram illustrating a wireless network in which the voice messaging systems of the invention can be practiced.

FIG. 1 is a block diagram illustrating an example of a wireless communication system in which the invention can be practiced. The wireless communication system of FIG. 1 includes a sender device 102 that is used to create and transmit an instant voice message that is addressed to a recipient wireless station 104. Sender device 102 can be a wireless or mobile telephone, a conventional wired telephone, or any other telephony device. In general, sender device 102 can be any device that is capable of receiving and capturing audio data that forms the body of the instant voice message and addressing information that identifies the recipient or the recipient wireless station 104 associated with the recipient. Instead of being a dedicated telephony device, sender device 102 can also be a personal computer, a personal digital assistant, or other computing devices having the foregoing capabilities.

In the embodiment of FIG. 1, sender device 102 communicates with a message server 106 using wireless data network 108. In general, however, sender device 102 can communicate with message server 106 using any suitable communication network or mechanism, another example of which is the Public Switched Telephone Network (PSTN). Message server 106 is a computer system that routes voice messages and performs the other operations described herein. It should be understood that the invention can be implemented in many types of network environments and various network architectures are applicable. In one embodiment, the message server 106 and the associated SMS blade 112 reside in a wireless operator's network infrastructure In another embodiment, the message server 106 and the SMS blade 112 reside outside the domain of a wireless operator's infrastructure, and may be hosted, for example, by an independent hosting entity, such as an application service provider. Alternately, the message server 106 and the associated SMS blade 112 can reside behind a corporate firewall.

Figure 2:
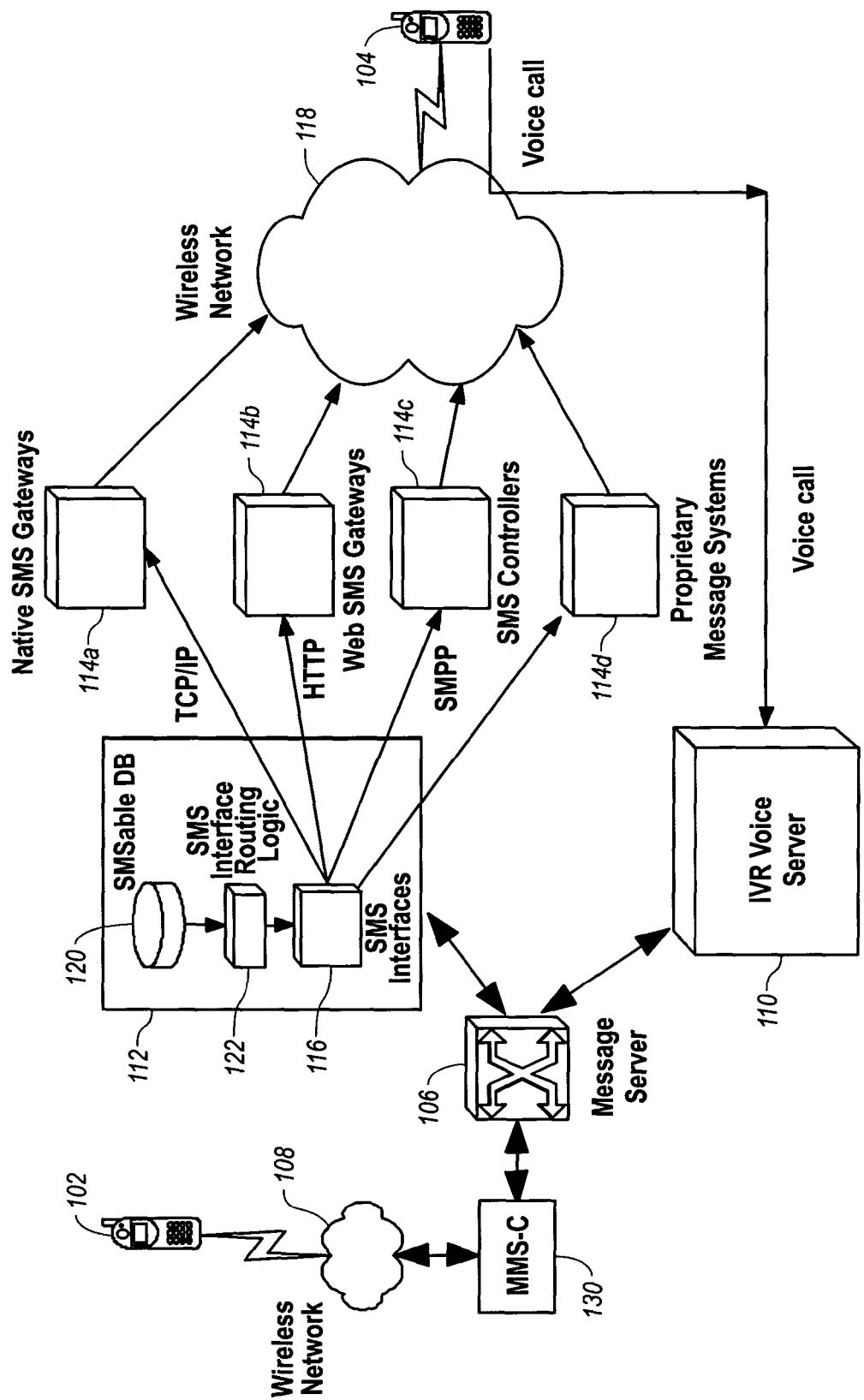
FIG. 2 is a block diagram illustrating another embodiment of a wireless network in which the voice messaging systems of the invention can be practiced.

In the embodiment of FIG. 2, sender device 102 communicates with an MMS-C 130 using wireless network 108. In general, however, sender device 102 can communicate with MMS-C 130 using any suitable communication network or mechanism, another example of which is the Public Switched Telephone Network (PSTN). MMS-C 130 is a computer system that receives and sends MMS messages by a process well known in the art. Message server 106 is a computer system that routes voice messages and performs the other operations described herein, including communicating with MMS-C 130 when necessary. In another embodiment all or part of the functionality of message server 106 and associated SMS blade 112 can be integrated with MMS-C 130.

In general, two types of instant voice messages are described herein. The first type includes instant voice messages that include only voice content and utilize a messaging protocol other than MMS. The second type includes MMS-based instant voice messages or messages having other formats that include voice content and may include other types of multimedia content. The instant voice messages of the invention are created using a dedicated voice messaging process that does not rely on first unsuccessfully attempting to establish a live telephone call with the intended recipient, as has been required in order to use conventional voice mail systems. As used herein, the terms "instant voice messaging" and "instant voice messages" refer to voice messaging that does not require the use of conventional voice mail systems in which the sender must first make an unsuccessful attempt to establish a live telephone call with the recipient. Instead, senders using an instant voice messaging system can cause an instant voice message to be created and sent to the recipient at a time of the sender's choosing. The invention is first described below in the context of messages that include only voice content and utilize a messaging protocol other than MMS. The manner in which this process is extended to delivering MMS-based instant voice messages will then be described.

Figure 4A:
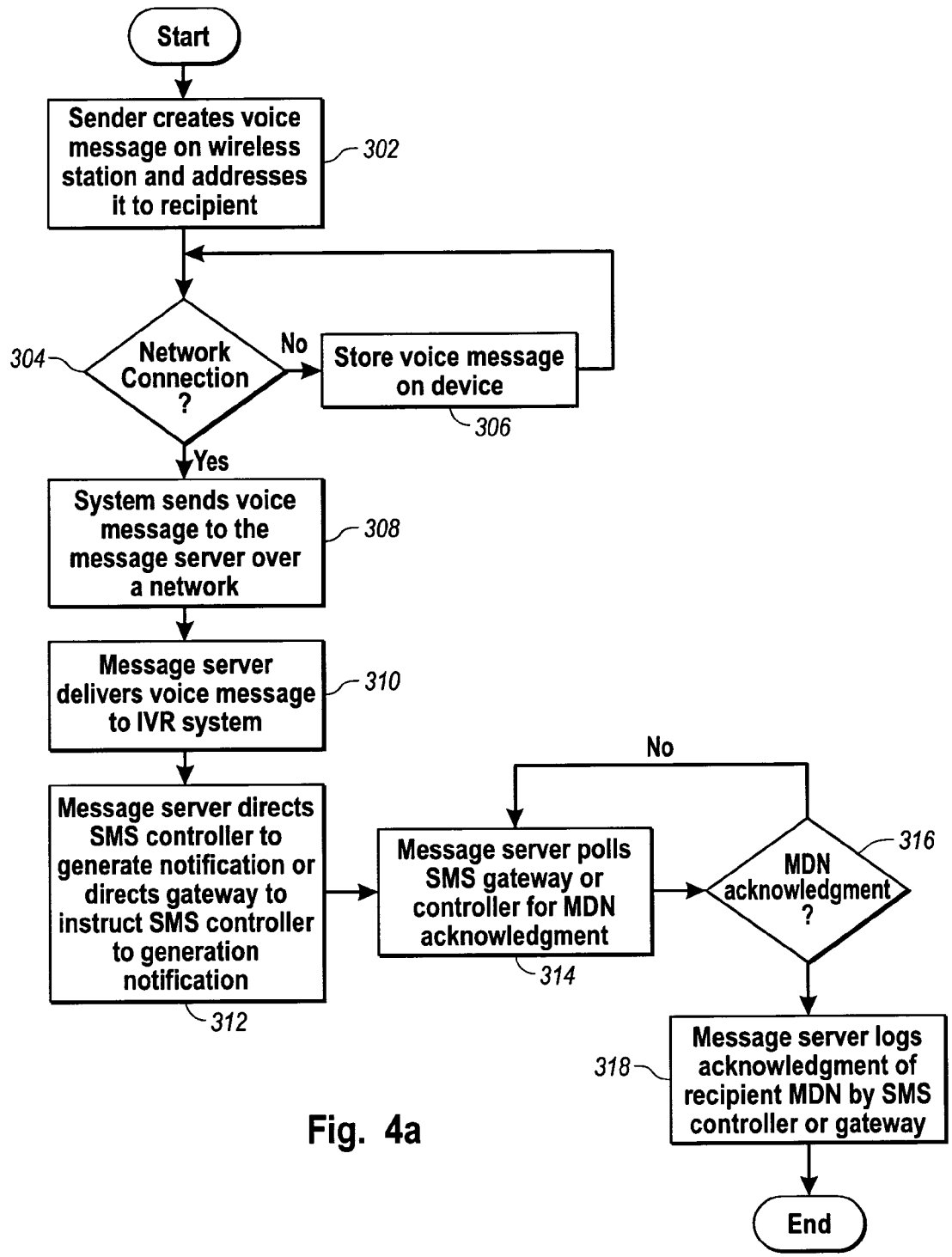
FIG. 4a is a flow diagram illustrating the method of initiating delivery of a voice message to a designated recipient.

An embodiment of the methods for creating and initiating transmission of an instant voice message is now described in reference to FIGS. 1 and 4a. In step 302 of FIG. 4a, a sender creates an instant voice message on the wireless station or other telephony device of the sender and addresses it to the recipient that uses recipient wireless station 104.

Although the instant voice messages that are delivered according to the invention can be created at the sender device 102 using any of a variety of possible user interfaces and procedures, one embodiment of the invention employs a method whereby the sender is required to press a button on sender device 102 only once or twice. For instance, the process of composing and transmitting an instant voice message can begin by the sender pressing a designated button on the sender device 102. In response to the button input, the sender device transitions to a mode in which it assists the sender in the process of composing the instant voice message. The sender can also speak the name or phone number of the intended recipient in order to provide the address for the instant voice message.

As the sender device is activated and as the instant voice message is composed and sent, the sender device can output tones or verbal cues to guide the user through the process of creating and sending the instant voice message and to verify that the message is being composed and sent as intended. In order to transmit the instant voice message after it is created, the sender again presses a button on the sender device 102. In other embodiments, either or both of the user inputs associated with depressing a button on the sender device 102 can be replaced with verbal commands. In another embodiment the message can be automatically transmitted unless the sender specifically intervenes to stop transmission within a certain period of time after the message is created. This streamlined process of creating an instant voice message with minimal manipulation of the sender device is particularly useful in settings in which handling the sender device is difficult, such as when the sender is driving a car. Again, however, it is noted that the use of SMS notifications to indicate the delivery of instant voice messages to recipients can be practiced regardless of the procedure by which the sender uses the sender device to create the message.

The instant voice message is sent to the message server 106 after the instant voice message is created at the sender device 102. As shown in FIG. 4a, the sender device 102 determines in decision block 304 whether a network connection is currently present. For instance, the sender device 102 determines whether it is in range of a cellular base station. If the network connection is not present, the method advances to step 306, in which the instant voice message is stored locally on the sender device until such time that it is determined that a network connection is available.

When the network connection is available, the instant voice message is sent to the message server 106 in step 308. As noted above, the instant voice messages of the invention can be delivered to SMS-enabled recipient wireless stations 104 regardless of the other communication capabilities of the recipient wireless stations. The "other communication capabilities" that are referred to herein relate to the ability of the recipient wireless stations to directly receive instant voice messages using specific protocols or using particular networks or network service providers. For instance, instant voice messages can be delivered to SMS-enabled recipient wireless stations according to the invention without requiring the recipient wireless stations to be compatible with dedicated protocols that can natively support direct voice messaging. In addition, the instant voice messages can be delivered to recipients who are not part of the same wireless network as that of the sender, who are not subscribers of the messaging services provided to the sender, and who do not have another affiliation with message server 106. In other words, the recipient can be essentially any recipient with an SMS-enabled recipient wireless station and the ability to access an IVR system using a voice call as described herein.

Although the SMS-enabled recipient wireless stations 104 are not required to support dedicated messaging protocols, the methods of the invention can be adapted to take advantage of such messaging protocols if they are available. Otherwise, message server 106 of FIG. 1 delivers the instant voice message to an IVR voice server 110 of an IVR system in step 310 in preparation for instructing recipient wireless station 104 to access the instant voice message from the IVR voice server. The message is stored in the IVR voice server 110 along with information identifying the recipient, including a Mobile Directory Number (MDN) associated with the wireless station of the recipient. The IVR voice server 110 can the use the MDN to authenticate the recipient when an attempt is made to retrieve the stored voice message as will be described in greater detail below. IVR voice server 110 and the associated IVR system can be adapted from conventional IVR voice servers and systems to perform the operations disclosed herein. Those of skill in the art, upon learning of the invention disclosed herein, will understand the necessary operational details of IVR voice server 110 and the associated IVR system.

In step 312 of FIG. 4a the message server 106 directs an SMS controller or gateway to generate and send an SMS message, or notification, regarding the fact that a voice message for the recipient wireless station 104 has been stored in IVR voice server 110. In the embodiment of FIG. 1, the message server 106 uses an SMS blade 112 that interfaces with the appropriate SMS message generation mechanism 114a–d. The SMS blade 112 can be incorporated into message server 106 or can be implemented in a device that interfaces with the message server. The SMS blade 112 can use hardware, software, firmware, or a combination thereof to interface with the appropriate SMS generation mechanism 114a–d and to perform the other operations that are described in detail below in reference to FIG. 3.

In order to inform recipient wireless station 104 of the stored voice message in IVR voice server 110, the appropriate SMS message generation mechanism 114a–d is used to create the SMS notification for the recipient wireless station. As shown in FIG. 1, the SMS message generation mechanisms include a native SMS gateway 114a that uses TCP/IP, a web SMS gateway 114b that uses HTTP, an SMS controller that uses the Short Message Peer to Peer Protocol 114c (SMPP), and proprietary message systems 114d. SMS blade 112 includes SMS interfaces 116 that communicate with the corresponding SMS message generation mechanisms 114a–d using the appropriate protocol. The appropriate SMS message generation mechanism 114 that is used to create and send the SMS message or notification to recipient wireless station 104 is the SMS message generation mechanism that is capable of sending an SMS message to the recipient wireless station. The message server directs the SMS controller or gateway to generate and send the SMS message by identifying the designated recipient using the MDN associated with the recipient.

If the message server 106 is not yet aware of which SMS message generation mechanism 114a–d, if any, is capable of sending SMS messages to the recipient, the message server, in step 314, polls the SMS controller or gateway for an MDN acknowledgment, which verifies that the particular SMS controller or gateway recognizes the recipient and can send the SMS message to the recipient wireless station. If, according to decision block 316, the message server 106 receives the recipient MDN acknowledgment from a particular SMS controller or gateway, the message server logs this fact in database 120 in step 318 and can use this information to route future messages. More details regarding steps 314, 316 and 318 are described below in reference to FIG. 3.

The SMS message that is sent by the appropriate message generation mechanism 114 is transmitted by wireless network 118 to recipient wireless station 104. Wireless network 118 is the wireless network in which recipient wireless station 104 operates and can be the same as, or different from, wireless network 108 associated with the sender device. Indeed, one of the benefits of the invention is that voice messages can be delivered to recipient wireless station 104 even if the recipient wireless station operates in a different network or uses a different network service provider compared to those associated with sender device 102.

The SMS message notifies recipient wireless station 104 that a voice message is stored in IVR voice server 110 and is waiting to be accessed and includes instructions for enabling the recipient wireless station to access the voice message. The instructions can include the telephone number of the IVR voice server 110 and, optionally, an explanation of the way in which the voice message can be retrieved. The SMS message may also include information pertaining to the message such as a sender identifier, subject, time of creation, and location of sender. The SMS message is sent to the recipient and appears on the recipient's wireless station along with an optional audio alert indicating arrival of the SMS message. The alert can be audible, visual, tactile, or any combination thereof.

Figure 5:
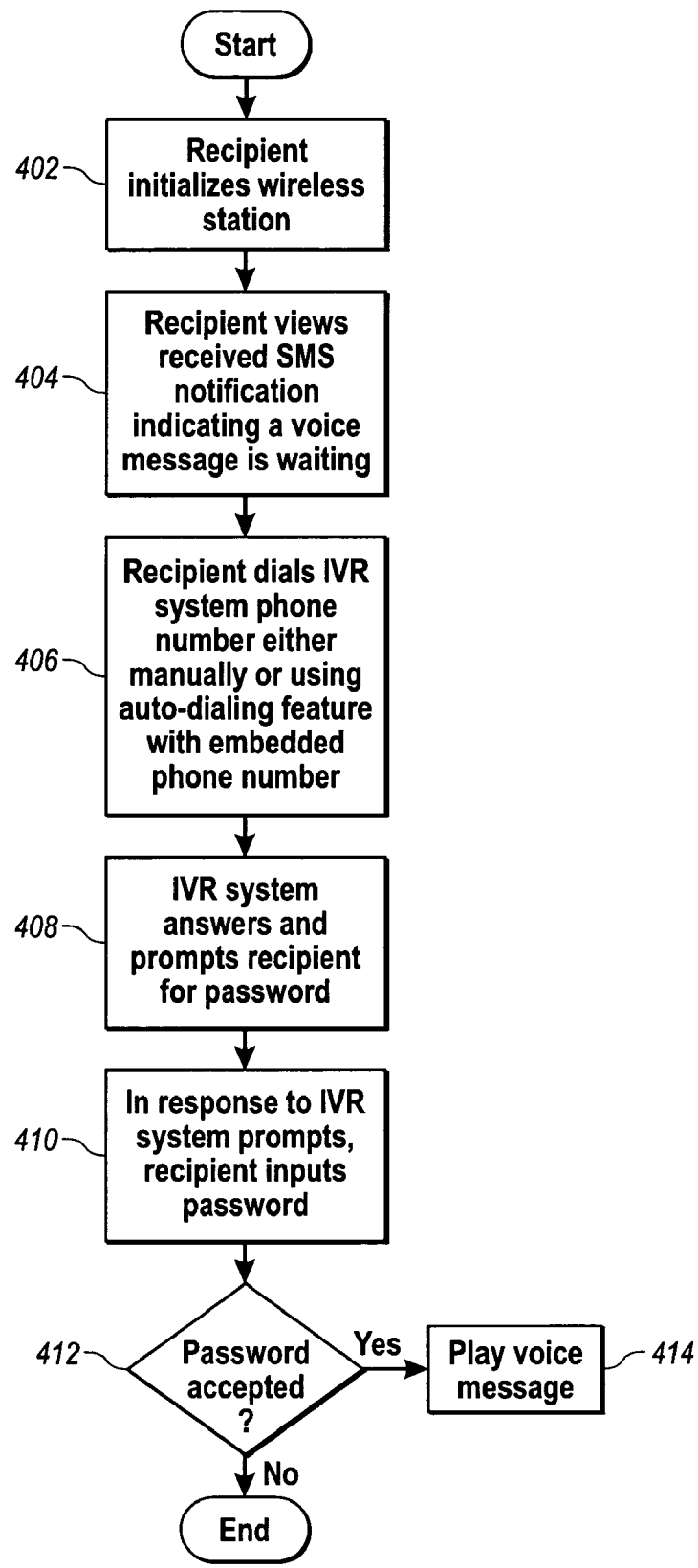
FIG. 5 is a flow diagram illustrating a method of the invention by which a recipient accesses a voice message in response to receiving an SMS notification.

An embodiment of the methods for accessing the stored instant voice message is now described in reference to FIGS. 1 and 5. In step 402, the recipient wireless station is initiated by the recipient. The recipient then views the received SMS notification in step 404 and learns that an instant voice message is stored and is waiting to be accessed. In step 406, the recipient dials the IVR voice server 110 either manually or using an automatic dialing feature that executes the telephone number of the IVR voice server embedded in the SMS notification.

The IVR voice server 110 then answers the telephone call from the recipient in step 408 and prompts the recipient to enter a password that can authenticate the recipient. If the recipient has not previously accessed the IVR voice server 110 to retrieve instant voice messages, the recipient first creates a password that can be used to retrieve future messages. In the case of a first-time recipient, the IVR voice server generally requires a way to recognize or determine whether the party who claims to be the recipient is in fact the recipient designated by the sender. One technique for doing so requires the apparent recipient to place the first telephone call from the recipient's primary wireless station 104 that has an MDN that matches the MDN corresponding to the recipient that the IVR voice server 110 has previously received and linked to the voice message. If the apparent recipient places a telephone call that has the matching MDN associated with the recipient wireless station 104, the IVR voice server 110 concludes that the apparent recipient is the actual recipient. The recipient is then prompted to create a personal identification number or another password. This password is stored at the IVR voice server 110 and, when the recipient attempts to access future instant voice messages, the recipient can do so from any telephony device so long as the recipient can produce the correct password.

In response to the prompt of step 408, the recipient enters the password according to step 410. If, according to decision block 412, the password is accepted, the voice message is played by the IVR voice server 110 in step 414 and is thereby accessed by the recipient. The IVR voice server 110 can then also enable the recipient to process the voice message in any of a variety of ways, including replaying, deleting, storing, forwarding, skipping, etc.

The IVR voice server 110 can also permit the recipient to create and send a reply instant voice message to the original sender. This process is initiated, for example, when the recipient responds to a voice prompt indicating that a reply instant voice message can be created. The recipient creates the reply instant voice message and indicates that it is to be sent to the original sender. At this point, the reply message is essentially another instant voice message that can be processed by message server 106 according to the methods described herein in reference to FIGS. 1–5. The reply message is stored in an IVR voice server and an SMS notification is sent to the original sender indicating that an instant voice message (i.e., the reply message) is accessible from the IVR voice server. The IVR voice server where the reply message is stored can be the same as or different from the IVR voice server 110 where the original voice message was stored.

Various methods for optimizing bandwidth usage and enhancing the performance of the wireless communication system can be employed in combination with the instant voice messaging methods of the invention. For example, the instant voice messages described herein can be routed from the sender to the recipient at times selected to reduce peak usage of the network. In addition, the decision to transmit an instant voice message at or near the time at which it is generated or to delay transmission thereof can be made based on a priority assigned to the instant voice message. The priority can be assigned based on the subscription level of the sender or the recipient or based on preferences of the sender.

The priority value assigned to the instant voice message can be used to determine whether the delivery of the instant voice message can be time shifted in order to avoid excessive peak traffic in the wireless network. The time shifting can involve delaying the transmission of an instant voice message stored locally on the wireless station of the sender or delaying the transmission of an SMS notification to the recipient wireless station. Details associated with the methods for routing network data, such as instant voice messages, based on the priority of the data are described in U.S. Provisional Patent Application Serial No. 60/494,644, filed Aug. 11, 2003, entitled "Bandwidth Usage Optimization and Enhanced Performance for Wireless Networks," which is incorporated herein by reference.

As noted above, recipients can receive voice messages using an SMS-enabled wireless station regardless of the other communication capabilities of the wireless station. Likewise, the instant voice messages can be delivered to recipients who are not part of the same wireless network as that of the sender, who are not subscribers of the messaging services provided to the sender, and who do not have another affiliation with message server 106. In addition, any such recipient can then transmit a reply instant voice message to the original sender. Thus, any sender who subscribes to the messaging services that permit the sender to compose and initiate the instant voice messages described herein can engage in two-way instant voice messaging with substantially any SMS-enabled recipient device.

When a voice message is created and addressed to the recipient, the message server 106 and the associated SMS blade 112 operate to determine whether the designated recipient uses an SMS-enabled wireless station and whether the instant voice message can be delivered to the recipient. An embodiment of this method is now described in reference to FIGS. 1 and 3, which expands on the information described above in reference to steps 314, 316 and 318 of FIG. 4a. According to the method of FIG. 3 the message server or the SMS blade attempts to determine if a telephone number associated with the designated recipient is able to receive an SMS message. At block 202, an MDN that identifies the recipient's wireless station is obtained. The SMS blade 112 includes an SMSable database 120, which is a database that includes information specifying whether the designated recipient has an SMS-enabled wireless station, whether the designated recipient does not have an SMS-enabled wireless station or whether it is not yet determined whether the recipient has an SMS-enabled wireless station. The database 120 can be linked to or can include a contact or address list maintained by the sender. In decision block 204, the database 120 is accessed to determine whether the database includes information relating to whether the recipient has an SMS-enabled wireless device.

If, according to decision block 204, it is determined that the recipient wireless device is SMS-enabled, the appropriate SMS message generation mechanism 114*a–d*, as specified by database 120, is used to create and send the SMS notification. If the database 120 indicates that the designated recipient does not have an SMS-enabled wireless station, the voice message is undeliverable using the SMS notification technique and an error message can be returned to the sender. If, however, the database 120 does not specify whether the recipient has an SMS-enabled wireless station, the method then advances to step 206, in which SMS interface routing logic 122 of FIG. 1 is used to initiate a trial and error routine in which attempts are made to send SMS notifications to the recipient.

Figure 3:
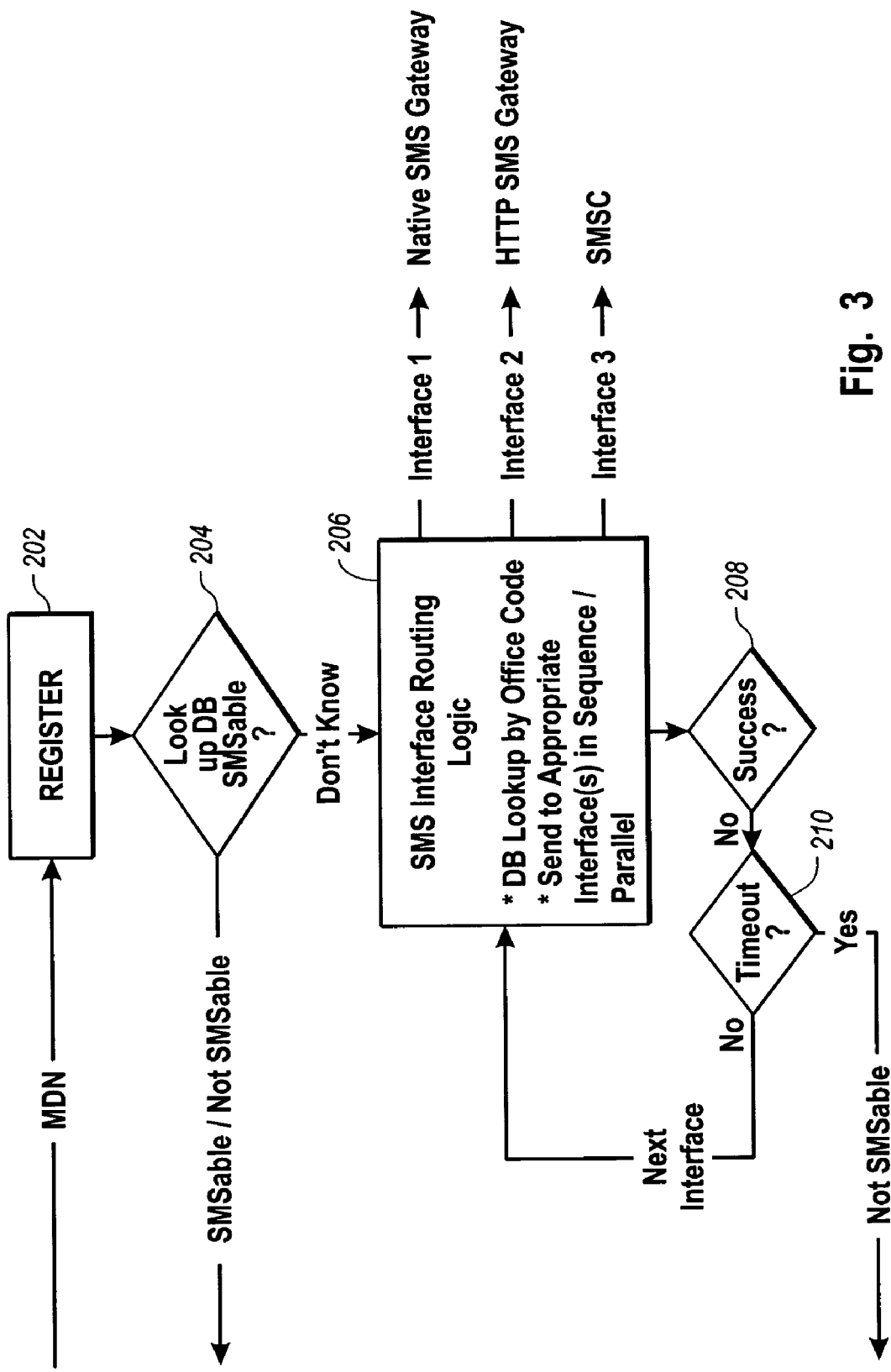
FIG. 3 is a flow diagram illustrating a method by which an SMS blade determines whether delivery of a voice message to a designated recipient is possible and, if so, initiates delivery of the voice message.

As shown in FIG. 3, the attempts to send SMS notifications can be made by using the SMS interfaces 116 and the corresponding SMS mechanisms 114*a–d* in parallel or in sequence. In response to an attempt with each of the SMS mechanisms 114*a–d*, it is determined in decision block 208 whether the attempt to send an SMS notification has been successful. With each attempt, the message server 106 monitors the SMS controller or SMS gateway for an indication that the target recipient telephone number has been recognized and accepted. If so, the recipient wireless station is determined to be SMS-enabled and the notification of the voice message stored in IVR voice server 110 can be delivered to the recipient wireless station. In addition, if the attempt is successful, the database 120 is updated to indicate that the recipient wireless station is SMS-enabled and to specify the appropriate SMS mechanism 114*a–d* to use in response to receiving future voice messages.

If the attempt is unsuccessful in decision block 208, the method proceeds to decision block 210 in which it is determined whether sufficient time has elapsed without a successful SMS notification delivery to conclude that the recipient does not have an SMS-enabled wireless station. If this is the case, the database is updated to indicate the lack of an SMS-enabled wireless station and an error message can be returned to the sender.

Checking the various interfaces for the ability to send an SMS message to a particular recipient can occur in response to a sender addressing and initiating delivery of a voice message to the recipient. This process can also take place in the background without being initiated by a particular voice message that is to be delivered to the recipient and without a subsequent action of sending an SMS message to the recipient. For example, the checking process can be performed in the background when sender inputs a new phone number into the sender's contact list, even if sender has not attempted to send any messages to that phone number.

Figure 4B:
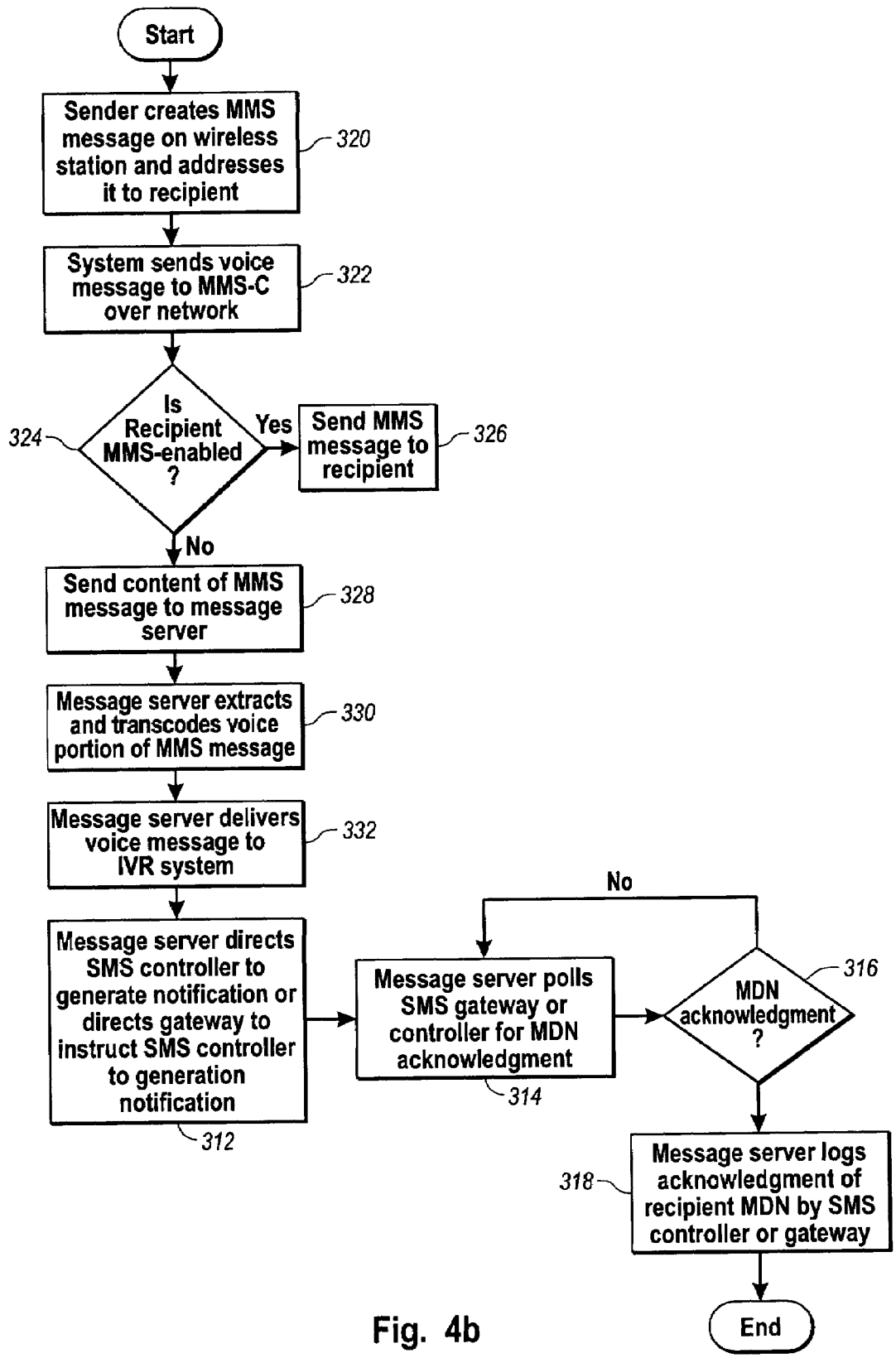
FIG. 4b is a flow diagram illustrating a method of initiating delivery of an MMS-based instant voice message to a designated recipient, including extracting voice content from the MMS message.

The invention has been described above in the context of the creation of an instant voice message with only voice content, using other than the MMS protocol, which is stored in an IVR voice server, with an SMS notification being sent to the recipient. These methods can also be adapted to enable users with MMS-enabled devices to cause the voice portion of MMS messages to be delivered to recipients with SMS-enabled devices, as shown in FIG. 4*b*. In this embodiment, the sender creates an MMS-based instant voice message in a conventional way in step 320, and the MMS message can include any type of content in addition to the voice content. At a time selected by the sender, the MMS message is sent in step 322 to the multimedia messaging service central (MMS-C) 130 of FIG. 2. This system can be optionally adapted to store the MMS-based instant voice message locally on the wireless station prior to being sent to the MMS-C 130 if it is determined that no network connection is immediately available, as has been described herein in reference to steps 304 and 306 of FIG. 4*a*. When the MMS-based instant voice message has been sent to MMS-C 130, the MMS-C then determines if the intended recipient device is MMS-enabled as shown at decision block 324 of FIG. 4*b*.

If the recipient uses an MMS-enabled device, the full MMS message can be delivered to the recipient in the conventional manner for delivery of MMS messages as shown at step 326, which is well known in the art. If, however, it is determined that the recipient has only an SMS-enabled device, MMS-C 130 passes the content of the MMS message to message server 106 in step 328 using a standard interface such as the MM3 protocol. Message server 106 then extracts the voice portion from the MMS message and transcodes the voice portion to an audio format such as .WAV, .WMA, or MP3 in step 330. Message server 106 sends the voice portion of the message to IVR voice server 110 as shown at step 332. In effect, the voice portion becomes an instant voice message with only voice or audio data, which is then processed in the manner described herein in reference to FIGS. 1–4*a* and 5. In particular, steps 312, 314, 316 and 318 are performed as previously described in reference to FIG. 4*a*. As part of this process, an SMS notification is sent to the recipient with an SMS-enabled device, which prompts the recipient to access the message from the IVR voice server 110. This method can be further extended to accommodate recipients without an MMS-enabled or SMS-enabled device. In this case, the voice portion of the MMS message can be delivered to the recipient using an e-mail or a web interface.

As described herein, recipients of instant voice messages can reply to the original senders using the IVR voice server 110. In this embodiment in which the original senders have MMS-enabled wireless stations, the reply messages created using the IVR voice server 110 can be transcoded by message server 106 into an MMS format, such as the adaptive multi-rate (AMR) format or another standard audio format utilized by MMS. In this case, the reply message can be sent to the original sender in the MMS format. The foregoing process provides MMS users with the ability to engage in two-way instant voice messaging communication with any SMS-enabled recipient device.

Another aspect of the invention is the ability for a user who wishes to send an instant voice message to initiate a voice call, using any kind of telephony device, to the IVR voice server without having been otherwise prompted, record a voice message and address it to the target recipient, and initiate delivery of the voice message. In this embodiment sender device 104 places a voice call to IVR voice server 110 and follows the system prompts for creating and addressing an instant voice message. The instant voice message is stored in IVR voice server 110 which then notifies message server 106 of the available instant voice message. In one scenario, message server 106 is aware of the capabilities of the recipient's wireless station, and if it knows that the recipient device is SMS-enabled, it causes an SMS notification with instructions for accessing the instant voice message from the IVR voice server 110 to be sent to the recipient's wireless station. Alternatively, if message server 106 is aware that the target recipient has an MMS-enabled wireless station, message server 106 transcodes the instant voice message into an audio format that can be utilized by MMS, such as the AMR audio format, and delivers the voice message to MMS-C 130. MMS-C 130 then delivers the MMS instant voice message to the recipient's wireless station in the conventional manner.

In the foregoing manner, instant voice messages can be created on a sender device, sent over a wireless network, and accessed by any new or legacy wireless station, regardless of the type of network, subscriber or member status, or type of sending device or receiving wireless device, so long as the receiving wireless device supports the SMS protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a wireless communication system, a method of initiating delivery of an instant voice message to a recipient wireless station, comprising:
   receiving a message for a recipient from a sender device at a message server without the sender device placing a call to the recipient, the sender device associated with a messaging service that includes the message server and an interactive voice response (IVR) system, the message including voice content and other multimedia content and designating a recipient;
   extracting the voice content from the message at the message server;
   storing the voice content in the IVR system;
   initiating transmission of a Short Message Service (SMS) notification to the recipient wireless station, the SMS notification including information permitting the recipient wireless station to access the IVR system; and
   in response to the IVR system receiving a request for the stored voice content, transmitting the stored voice content from the IVR system to the recipient wireless station.

2. The method of claim 1, wherein the recipient wireless device does not have the capability of processing the other multimedia content.

3. The method of claim 2, wherein extracting the voice content from the message is performed in response to a determination that the recipient wireless device does not have the capability of processing the other multimedia content.

4. The method of claim 1, wherein the message received from the sender device comprises a Multimedia Messaging Service message.

5. The method of claim 1, wherein the recipient is associated with a wireless operator different from a wireless operator associated with the sender.

6. The method of claim 1, further comprising:
   obtaining a reply message created by the recipient; and
   delivering the reply message to the sender.

7. The method of claim 6, wherein obtaining a reply message comprises recording the reply message at the IVR system in which the voice content extracted from the reply message is stored.

8. The method of claim 6, wherein delivering the reply message to the sender comprises:
   storing the reply message in an IVR system; and
   initiating transmission of an SMS notification to the sender device, the SMS notification including information permitting the sender device to access the IVR system in which the reply message is stored; and
   in response to the IVR system in which the reply message is stored receiving a request for the reply message, transmitting the stored reply message to the sender device.

9. The method of claim 6, wherein:
   the reply message created by the recipient includes voice content and no other multimedia content;
   the sender device is Multimedia Messaging Service (MMS)enabled; and
   delivering the reply message to the sender comprises:
      transcoding the voice content of the reply message to an audio format associated with MMS to create an MMS message; and
      initiating transmission of the MMS message to the sender device.

10. The method of claim 6, wherein the reply message is obtained upon creation of the reply message by the recipient using the IVR system.

11. The method of claim 6, wherein the reply message is created without the recipient device being compatible with any dedicated protocol that can natively support direct voice messaging.

12. The method of claim 1, wherein receiving the message from the sender device is performed upon the establishment of a network connection with the sender device, wherein the message has been previously created and stored at the sender device at a time when no network connection with the sender device exists.

13. The method of claim 1, wherein timing of the initiation of transmission of the SMS notification is determined based on a priority value assigned to the instant voice message.

14. In a wireless communication system, a method of enabling a recipient of an instant voice message to send a reply message, comprising:
   receiving an instant voice message for a recipient from a wireless station of a sender without the sender placing a call to the recipient, the instant voice message received at a messaging service associated with the wireless station of the sender, the messaging service including a first interactive voice response (IVR) system;
   notifying the recipient with a first Short Message service (SMS) notification that the messaging service of the sender has the instant voice message for the recipient, the first SMS notification enabling the recipient to access the IVR system to obtain the instant voice message;
   in the first interactive voice response (IVR) system from which the recipient has obtained the instant voice message, recording a reply message that is created by the recipient and is to be delivered to the sender of the instant voice message;
   storing the instant voice message in a second IVR system;
   initiating transmission of a second SMS notification to a wireless station of the sender, the second SMS notification including information permitting the wireless station of the sender to access the second IVR system; and
   in response to the second IVR system receiving a request for the stored instant voice message from the sender, transmitting the stored instant voice message from the IVR system to the wireless station of the sender.

15. The method of claim 14, wherein the first IVR system and the second IVR system are the same IVR system.

16. The method of claim 14, wherein the first IVR system and the second IVR system are different IVR systems.

17. The method of claim 14, wherein the reply message is created without a wireless device of the recipient being compatible with any dedicated protocol that can natively support direct voice messaging.

18. The method of claim 14, wherein:
the sender is a subscriber to an instant messaging service by which the instant voice message is created; and
the recipient is not a subscriber to any instant messaging service, but is permitted by the first IVR system to create the reply message to the instant voice message.

19. The method of claim 14, wherein the recipient is associated with a wireless operator different from a wireless operator associated with the sender.

20. The method of claim 14, comprising, prior to recording the reply message:
receiving the instant voice message from the wireless station of the sender;
storing the instant voice message in the first IVR system;
initiating transmission of an SMS notification to the wireless station of the recipient, the SMS notification including information permitting the wireless station of the recipient to access the first IVR system; and
in response to the first IVR system receiving a request for the stored instant voice message, transmitting the stored instant voice message from the first IVR system to the wireless station of the recipient.

21. In a wireless communication system, a method of enabling a recipient having a recipient wireless station that is not Multimedia Messaging Service (MMS)-enabled to receive voice content from an MMS message and to respond thereto, comprising:
sending the a voice content of an MMS message to a recipient without placing a call to the recipient including:
receiving the MMS message from a sender device, the message including voice content and other multimedia content;
extracting the voice content from the MMS message;
storing the voice content in a first interactive voice response (IVR) system from which the recipient accesses the voice content; and
initiating transmission of a Short Message Service (SMS) notification to the recipient wireless station, the SMS notification including information permitting the recipient wireless station to access the voice content from the first IVR system; and
sending a reply from the recipient to the sender of the MMS message without placing a call to the sender, including:
in the IVR system, recording a reply message that is created by the recipient and is to be delivered to the sender;
transcoding the voice content of the reply message to an MMS format to create an MMS reply message; and
initiating transmission of the MMS reply message to the sender device.

22. The method of claim 21, wherein extracting the voice content from the MMS message is performed in response to a determination that the recipient wireless station is not MMS-enabled.

23. In a recipient wireless station that operates in a wireless network, a method of replying to an instant voice message, comprising:
receiving a Short Message Service (SMS) notification that includes instructions for accessing an instant voice message stored in an interactive voice response (IVR) system, the IVR system associated with a sender of the instant voice message, wherein a sender delivered the instant voice message to the IVR system without placing a call to the recipient wireless station;
in response to the performance of the instructions, accessing the IVR system; and
transmitting voice data to the IVR system without placing a call to a sender of the instant voice message the IVR system recording the voice data to create a reply message to the instant voice message, the reply message being sent to the sender of the instant voice message.

24. The method of claim 23, wherein the reply message is sent to the sender by:
storing the reply message in the IVR system; and
transmitting, to a wireless station of the sender, an SMS notification including information permitting the wireless station of the sender to access the IVR system in which the reply message is stored; and
in response to the IVR system receiving a request for the stored reply message, transmitting the stored reply message to the wireless station of the sender.

25. The method of claim 23, wherein:
the reply message created by the IVR system includes voice content and no other multimedia content;
the wireless station of the sender is Multimedia Messaging Service (MMS) enabled; and
the reply message is sent to the sender by:
transcoding the voice content or the reply message to an audio format associated with MMS to create an MMS reply message; and
initiating transmission of the MMS reply message to the wireless station of the sender.

26. In a wireless station associated with a wireless communication system, a method for initiating transmission of an instant voice message, comprising:
at a time when no network connection between the wireless station and the wireless communication system exists, receiving user input including:
voice data; and
information specifying a recipient;
storing an instant voice message that includes the voice data locally at the wireless station; and
when a subsequent network connection between the wireless station and the wireless communication system exists, initiating transmission of the instant voice message from the wireless station to the wireless communication system without attempting to establish a live telephone call between the wireless station and the recipient, such that the instant voice message is sent to the recipient, wherein a message server provides the recipient with instructions on how to retrieve the instant voice message from an interactive voice response system.

27. The method of claim 26, wherein the instant voice message is stored locally in response to a determination that is made automatically by the wireless station that no network connection exists.

28. The method of claim 27, wherein the instant voice message is stored locally further in response to user input indicating that the instant voice message is complete and is to be sent, resulting in the automatic determination that no network connection exists.

29. The method of claim 26, further comprising automatically determining, by the wireless station, that the subsequent network connection exists, such that transmission of the instant voice message is initiated without further user input.

30. The method of claim 26, wherein initiating transmission of the instant voice message comprises initiating transmission of the instant voice message to an interactive voice response (IVR) system, wherein the recipient is notified of the instant voice message at the IVR system.

31. The method of claim 29, wherein the recipient is notified upon receiving a Short Message Service (SMS) notification at a recipient wireless station, the SMS notification including information permitting the recipient wireless station to access the IVR system.

32. The method of claim 26, wherein initiating transmission of the instant voice message comprises initiating transmission of the instant voice message to a recipient wireless station of the recipient, the recipient wireless station being adapted to directly receive instant voice messages from the wireless communication system without requiring the recipient to access an interactive voice response (IVR) system.

33. The method of claim 26, wherein the instant voice message includes the voice data and other multimedia content, wherein the wireless communication system, upon receiving the instant voice message:

extracts the voice data from the instant voice message;

stores the voice content in an interactive voice response (IVR) system;

initiates transmission of a Short Message Service (SMS) notification to a recipient wireless station of the recipient, the SMS notification including information permitting the recipient wireless station to access the IVR system; and in response to the IVR system receiving a request for the stored voice data, transmits the stored voice data from the IVR system to the recipient wireless station.

34. The method of claim 26, wherein timing of the initiation of transmission of the instant voice message from the wireless station to the wireless communication system is determined based on a priority value assigned to the instant voice message.

* * * * *